(12) United States Patent
Ogasawara et al.

(10) Patent No.: US 9,065,125 B2
(45) Date of Patent: Jun. 23, 2015

(54) BUSBAR MODULE AND POWER SUPPLY APPARATUS INCORPORATING THE SAME

(75) Inventors: Shigeyuki Ogasawara, Makinohara (JP); Katsunori Sato, Makinohara (JP); Hideki Inoue, Makinohara (JP); Motoo Nojima, Ohta-ku (JP); Takenori Tsuchiya, Toyota (JP); Takao Shoji, Toyota (JP)

(73) Assignees: Yazaki Corporation, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 130 days.

(21) Appl. No.: 13/997,727

(22) PCT Filed: Dec. 28, 2010

(86) PCT No.: PCT/JP2010/073910
§ 371 (c)(1),
(2), (4) Date: Jun. 25, 2013

(87) PCT Pub. No.: WO2012/090340
PCT Pub. Date: Jul. 5, 2012

(65) Prior Publication Data
US 2013/0302662 A1 Nov. 14, 2013

(51) Int. Cl.
*H01M 2/26* (2006.01)
*H01M 2/20* (2006.01)
*H01M 10/48* (2006.01)
*H01M 2/02* (2006.01)
*H01M 2/10* (2006.01)

(52) U.S. Cl.
CPC ............ *H01M 2/206* (2013.01); *H01M 2/0242* (2013.01); *H01M 2/0237* (2013.01); *H01M 2/1077* (2013.01); *H01M 10/48* (2013.01)

(58) Field of Classification Search
CPC ... H01M 10/48; H01M 2/1077; H01M 2/206; H01M 2/0237; H01M 2/0242
USPC .......................... 429/121, 138, 163, 170, 175
See application file for complete search history.

(56) References Cited

U.S. PATENT DOCUMENTS

2011/0020686 A1* 1/2011 Yamamoto et al. ........... 429/120
2012/0156543 A1* 6/2012 Cicero et al. ................. 429/120

FOREIGN PATENT DOCUMENTS

| EP | 0 986 114 A1 | 3/2000 |
| EP | 1 059 682 A1 | 12/2000 |

(Continued)

OTHER PUBLICATIONS

European Search Report (extended) dated Apr. 28, 2014 in corresponding EP Application EP 10861304.3.

*Primary Examiner* — Patrick Ryan
*Assistant Examiner* — Ben Lewis
(74) *Attorney, Agent, or Firm* — Sughrue Mion, PLLC (57) ABSTRACT

A power supply apparatus 1 includes: a battery cell assembly 2 including battery cells 3 having a positive terminal 11 at one end and a negative terminal 12 at the other end; a busbar module 5 attached to the assembly 2 and configured to connect the cells 3 in series with each other; and a pair of electric wires 9 connected to electrodes 11, 12 taking out a voltage of the series-connected cells 3. The busbar module 5 includes: bus bars 6 configured to connect the positive terminal 11 and the negative terminal 12 of the mutually adjacent battery cells 3 of the assembly 2; a plate 8 disposed on the assembly 2 with the bus bars 6 attached thereto; and an electric wire holding portion 18 provided on the plate 8 configured to hold one electric wire 9a of the pair of the electric wires 9. The electric wire holding portion 18 extends in the arrangement direction X in which the cells 3 are arranged at a central portion of the plate 8 in the width direction Z orthogonal to the direction X of the battery cells 3.

5 Claims, 6 Drawing Sheets

(56) References Cited

FOREIGN PATENT DOCUMENTS

| | | |
|---|---|---|
| JP | 10-248145 A | 9/1998 |
| JP | 2000-333343 A | 11/2000 |
| JP | 2003-045409 A | 2/2003 |
| JP | 2009-117149 A | 5/2009 |
| JP | 2010-170884 A | 8/2010 |
| JP | 2010-225583 A | 10/2010 |

* cited by examiner

FIG. 6

BUSBAR MODULE AND POWER SUPPLY APPARATUS INCORPORATING THE SAME

CROSS REFERENCE TO RELATED APPLICATIONS

This application is a National Stage of International Application No. PCT/JP2010/073910 filed Dec. 28, 2010, the contents of all of which are incorporated herein by reference in their entirety.

TECHNICAL FIELD

The present invention relates to a power supply apparatus for use in vehicles such as a hybrid electric vehicle (HEV) and an electric vehicle (EV), and in particular to a power supply apparatus that includes a busbar module for series-connecting a plurality of battery cells.

BACKGROUND ART

An electric vehicle powered by an electric motor and a hybrid electric vehicle powered by a combustion engine and an electric motor incorporate a power supply apparatus as a source for driving the electric motor. The power supply apparatus includes a battery cell assembly constructed by a plurality of battery cells each having a positive electrode at one end and a negative electrode at the other end, the battery cells being series-connected with each other to obtain a desired voltage. These battery cells are arranged in one direction and juxtaposed to each other.

It is often the case with the power supply apparatus of this sort that the positive electrode of one of a mutually adjacent pair of the battery cells that belong to the battery cell assembly is connected via a connecting member to the negative electrode of the other of the pair of the battery cells so that the battery cells are connected to construct the battery cell assembly. The use of such connecting members attached to the battery cell assembly needs troublesome process for assembling the power supply apparatus.

To address the aforementioned problem, as an example, a busbar module is advocated that is capable of attaching the connecting members en bloc to the battery cell assembly, the connecting members used to connect the battery cells in series with each other (for example, see the patent literature PTL 1). The busbar module described in the patent literature PTL 1 includes: a plurality of bus bars serving as the connecting members for series-connecting the battery cells to construct the battery cell assembly; a plurality of electric wires for voltage detection detecting voltage of corresponding each of the battery cells, the electric wires each having a terminal attached to its end and used to connect the electric wires to each of the bus bars; and a plate with the bus bars and the electric wires for voltage detection attached thereto, the plate adapted to be mounted to the battery cell assembly.

The bus bars may be made of electrically conductive metal material in a shape of a strip having holes for passing therethrough the positive and negative electrodes. The electric wires for voltage detection are known sheathed electric wires that include an electrically conductive core wire and insulating sheath covering the core wire. The terminal is attached to its end. The terminal includes an electrode connecting part piled on the bus bar and having a hole through which the electrode is passed and an electric wire connecting part configured to be connected to the electric wire.

The plate is made of synthetic resin, whose planar shape takes the shape of a rectangular flat plate. The plate includes: a plate body having a plurality of holes provided therein for passing the positive and negative electrodes therethrough; a plurality of busbar-accommodation portions arranged on a surface of the plate body in a direction in which the battery cells are arranged, the busbar-accommodation portions being constructed to accommodate the bus bars and terminals connected to each of the bus bars; a plurality of electric wire holding portions holding the voltage-detecting electric wires disposed therein; and a cover provided on the plate body by means of a hinge. Also, the plate includes an accommodating groove positioning therein one electrical wire extending from an end of the plate body, the one electrical wire being connected to an electrode taking out a voltage of the series-connected battery cells and configured to output the voltage to an external device.

In the aforementioned busbar module, the plate including the bus bars and the terminals that are attached to each of the bus bar accommodating portions is disposed upon the surface of the battery cell assembly on which the electrode is provided. Further, the electrodes of the battery cells are passed through each of the holes of the plate body and holes of the bus bar and the terminal. After that, nuts are screwed onto the electrodes of the battery cells. In this manner, the bus bars are attached to the battery cell assembly with the battery cells connected in series with each other via the bus bars.

The voltage-detecting electric wires connected to each of the terminals are positioned inward of each of the electric wire holding portions, the one electrical wire connected to the electrode for taking out the voltage of the series-connected battery cells of the battery cell assembly is positioned inward of the accommodating groove provided in the plate of the busbar module, and thus the voltage-detecting electric wires and the one electrical wire are secured to the busbar module. Further, another electrical wire is connected to another electrode adapted to take out the voltage of the series-connected battery cells.

In this manner, the aforementioned busbar module, with the plate to which the bus bars and the terminals are attached is mounted to the battery cell assembly, so that the bus bars is used to connect the battery cells of the battery cell assembly in series with each other, and each of the terminal attached to each of the voltage-detecting electric wires can be connected to each of the battery cell of the battery cell assembly, thereby the operation of installation to the battery cell assembly is facilitated.

CITATION LIST

Patent Literature

PTL 1: Japanese Patent Application Laid-Open Publication No. 2000-149909

SUMMARY OF INVENTION

Technical Problem

However, since, in the aforementioned busbar module of the patent literature PTL 1, the one electrical wire connected to the electrode taking out the voltage of the series-connected battery cells and configured to output the voltage to an outside is positioned inward of each of the accommodating groove extending from the edge of the plate body so as to secure the one electrical wire, the external components may be brought into contact with the one electrical wire, causing damage to the one electrical wire due to vibrations during driving and large impacts in the event of vehicle's collision.

In view of the above-identified problem, an object of the present invention is to provide a busbar module that is capable of preventing damage to the one electric wire and also to provide a power supply apparatus incorporating the same.

Solution to Problem

In order to achieve the above-identified objective, a busbar module according to a first aspect of the present invention includes: a plurality of bus bars configured to connect a plurality of battery cells in series with each other, the battery cells each having a positive electrode and a negative electrode, the positive electrode of one of a mutually adjacent pair of the battery cells being connected to the negative electrode of an other of the mutually adjacent pair of the battery cells, and thereby the battery cells constructing a battery cell assembly; a plate disposed upon the battery cell assembly, with the bus bars attached to the plate; and an electric wire holding portion provided on the plate and configured to hold one electric wire of a pair of electric wires, the pair of electric wires each being connected to one electrode of the battery cells connected in series with each other so as to take out a voltage of the battery cells, the electric wire holding portion extending in an arrangement direction in which the battery cells are arranged, and the electric wire holding portion being provided at a central portion of the plate, the central portion being central with reference to a width direction orthogonal to the arrangement direction.

According to a second aspect of the present invention, in the busbar module according to the first aspect of the present invention, the plate includes a cover configured to cover a connection between the one electric wire and the one electrode to which the one electric wire is connected.

According to a third aspect of the present invention, in the busbar module according to the first or second aspect of the present invention, the electric wire holding portion includes (a) a wall portion continuing to a plate body of the plate and to a first accommodating portion accommodating the bus bar, wherein the one electrical wire is disposed in an overlapping manner upon the wall portion; and (b) a pair of securing pieces adapted to clamp the one electric wire therebetween.

According to a fourth aspect of the present invention, there is provided a power supply apparatus that includes a battery cell assembly constructed by battery cells each having a positive electrode at one end thereof and a negative electrode at an other end thereof; the busbar module according to any one of the first to third aspects, the busbar module being attached to the battery cell assembly and configured to connect the battery cells of the battery cell assembly in series with each other; and a pair of electric wires each connected to the electrode that takes out a voltage of the battery cells connected in series with each other.

According to the invention according to the first aspect, the electric wire holding portion extends in the arrangement direction in which the battery cells are arranged and is arranged at the central portion of the plate in the width direction orthogonal to the arrangement direction in which the battery cells are arranged. Accordingly, it is possible to reduce the possibility of external components coming into contact with the one electric wire connected to the electrode for taking out the voltage of the series-connected battery cells.

According to the invention in the second aspect, the plate includes the cover covering the connection between the one electric wire and the electrode connected to the one electric wire. It is possible to prevent the external components from coming into contact between the one electric wire and the electrode due to vibrations during driving and large impacts in the event of vehicle's collision.

According to the invention in the third aspect, since the electric wire holding portion makes the one electrical wire rest upon and overlap with the wall portion continuing to the plate body of the plate and the first accommodating portion, there is no need for the plate to have a portion dedicated to making the one electrical wire disposed in the overlapping manner thereon.

According to the invention in the fourth aspect, the power supply apparatus includes the aforementioned busbar module. It is possible to reduce the possibility of the external components coming into contact with the one electric wire connected to the electrode for taking out the voltage of the series-connected battery cells due to the vibrations during driving and the large impacts in the event of vehicle's collision. Also, it is possible to prevent the external components from coming into contact with the connection between the one electric wire and the electrode connected thereto.

Advantageous Effects of the Invention

As has been explained in the foregoing, the invention according to the first aspect makes it possible to prevent the external component from coming into contact with the one electric wire connected to the electrode for taking out the voltage of the series-connected battery cells due to the vibrations during driving and the large impacts in the event of vehicle's collision, which makes it possible to reduce the possibility of damage to the one electric wire.

The invention according to the second aspect is capable of preventing the external components from coming into contact with the connection between the one electric wire and the electrode, due to the vibrations during driving and the large impacts in the event of vehicle's collision. It is possible to prevent damage to and disconnection of the connection between the one electric wire and the electrode.

The invention according to the third aspect makes it possible to prevent the plate from becoming larger, for the plate does not need to include the portion dedicated to making the one electrical wire overlap therewith.

The invention according to the fourth aspect makes it possible to prevent the external component from coming into contact with the one electric wire connected to the electrode for taking out the voltage of the series-connected battery cells in the event of vibrations during driving and large impacts in the event of vehicle's collision, and prevent the external components from coming into contact with the connection to the one electric wire and the electrode connected to the one electric wire. By virtue of this, it is possible to mitigate the possibility of damage to the one electric wire, and it is possible to prevent damage to and disconnection of the connection between the one electric wire and the electrode.

DESCRIPTION OF THE EMBODIMENT

The following describes a power supply apparatus according to an exemplary embodiment of the present invention with reference to FIGS. 1 to 5.

The power supply apparatus 1 according to the exemplary embodiment of the present invention is incorporated in an electric vehicle powered by an electric motor or in a hybrid electric vehicle powered by an engine and an electric motor. The power supply apparatus 1 is designed to supply electrical power to these electric motors.

Figure 1:
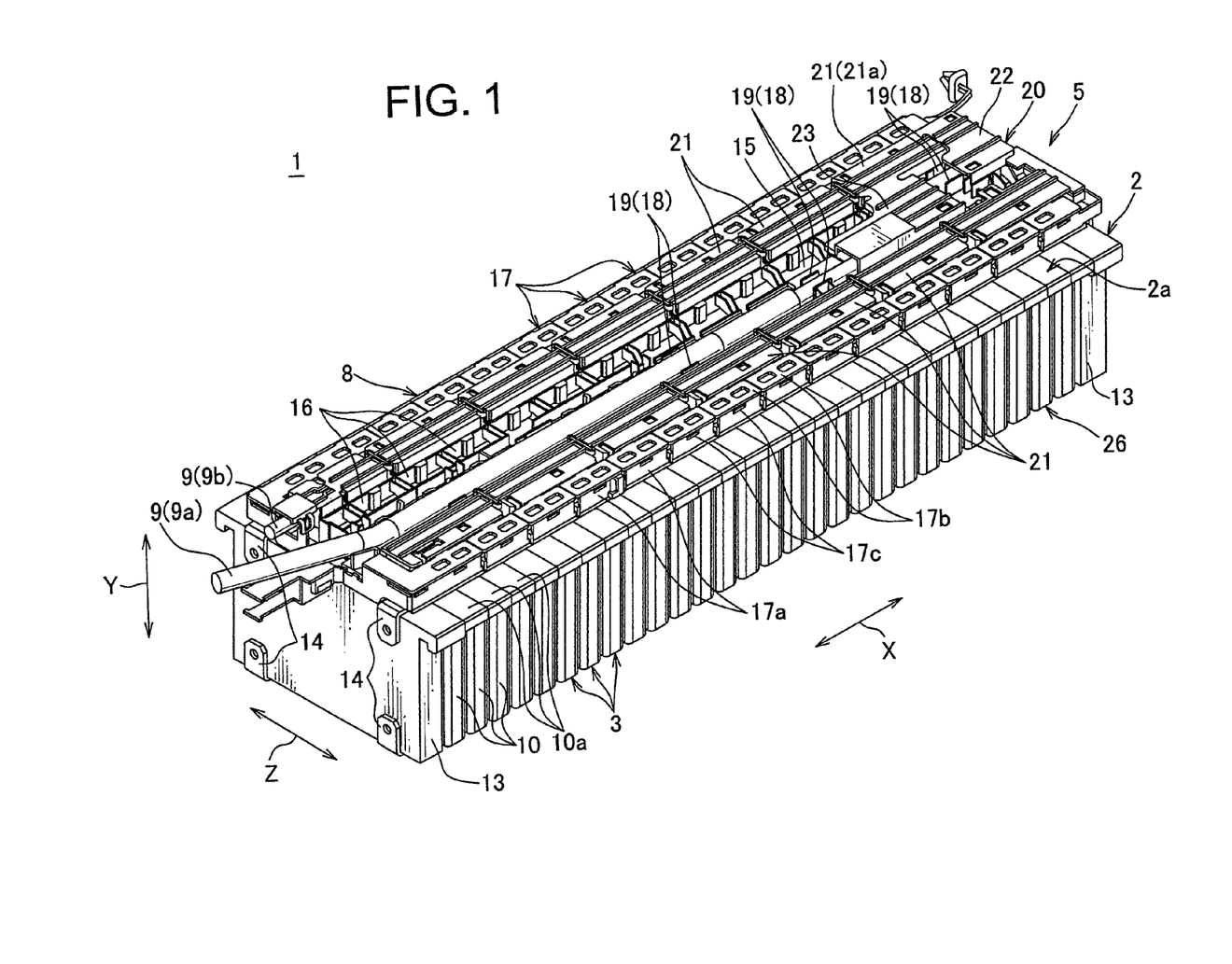
FIG. 1 is a perspective view of a power supply apparatus according to one embodiment of the present invention.

Referring to FIG. 1, the power supply apparatus 1 of the present invention includes a battery cell assembly 2, a busbar module 5 attached to the battery cell assembly 2, and a pair of electric wires 9.

The battery cell assembly 2 includes a plurality of battery cells 3 and fixing member 4 adapted to bind (or stack) and fix the battery cells 3 together.

Figure 2:
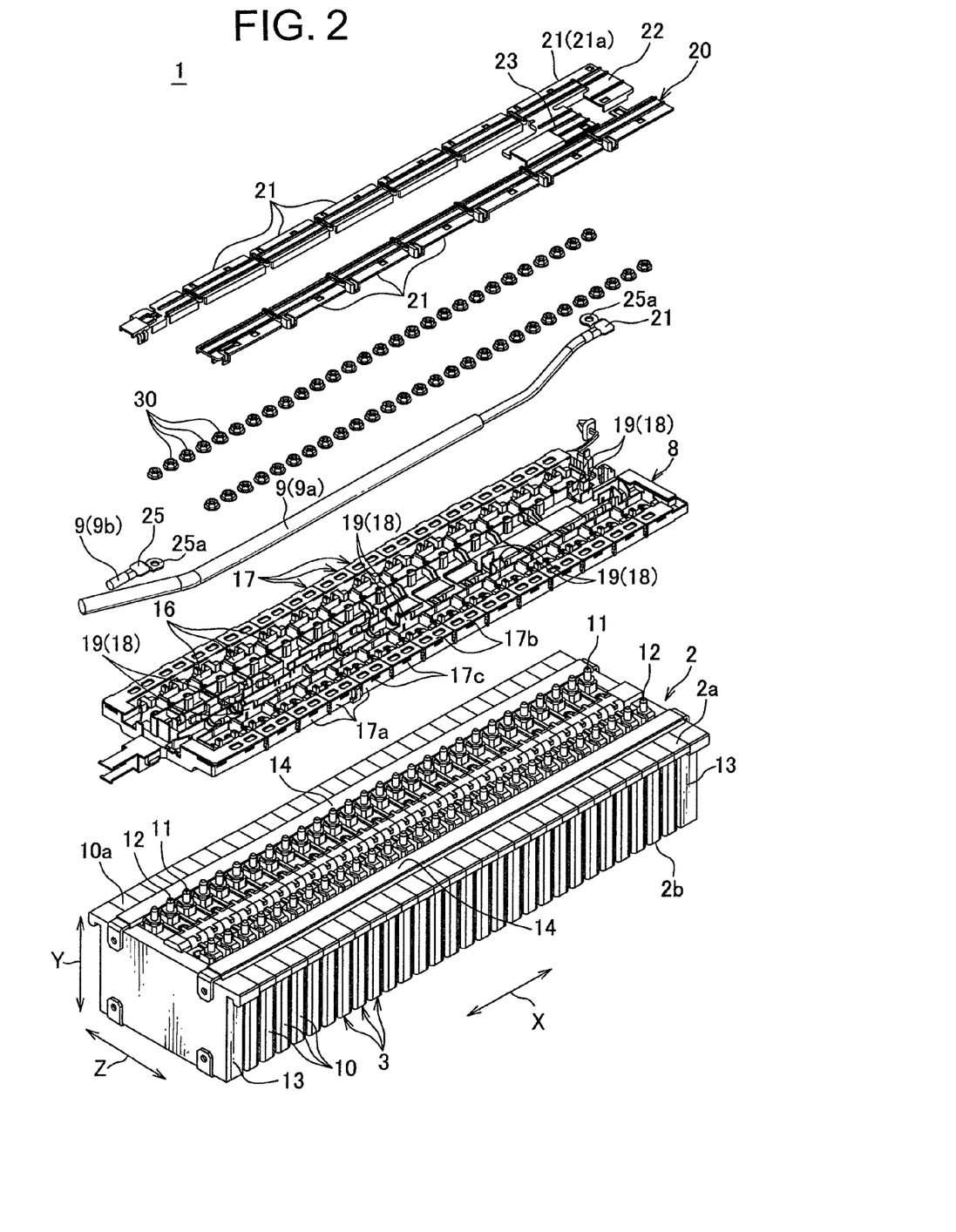
FIG. 2 is a busbar module of the power supply apparatus of FIG. 1 illustrated in a disassembled state.
Figure 3:
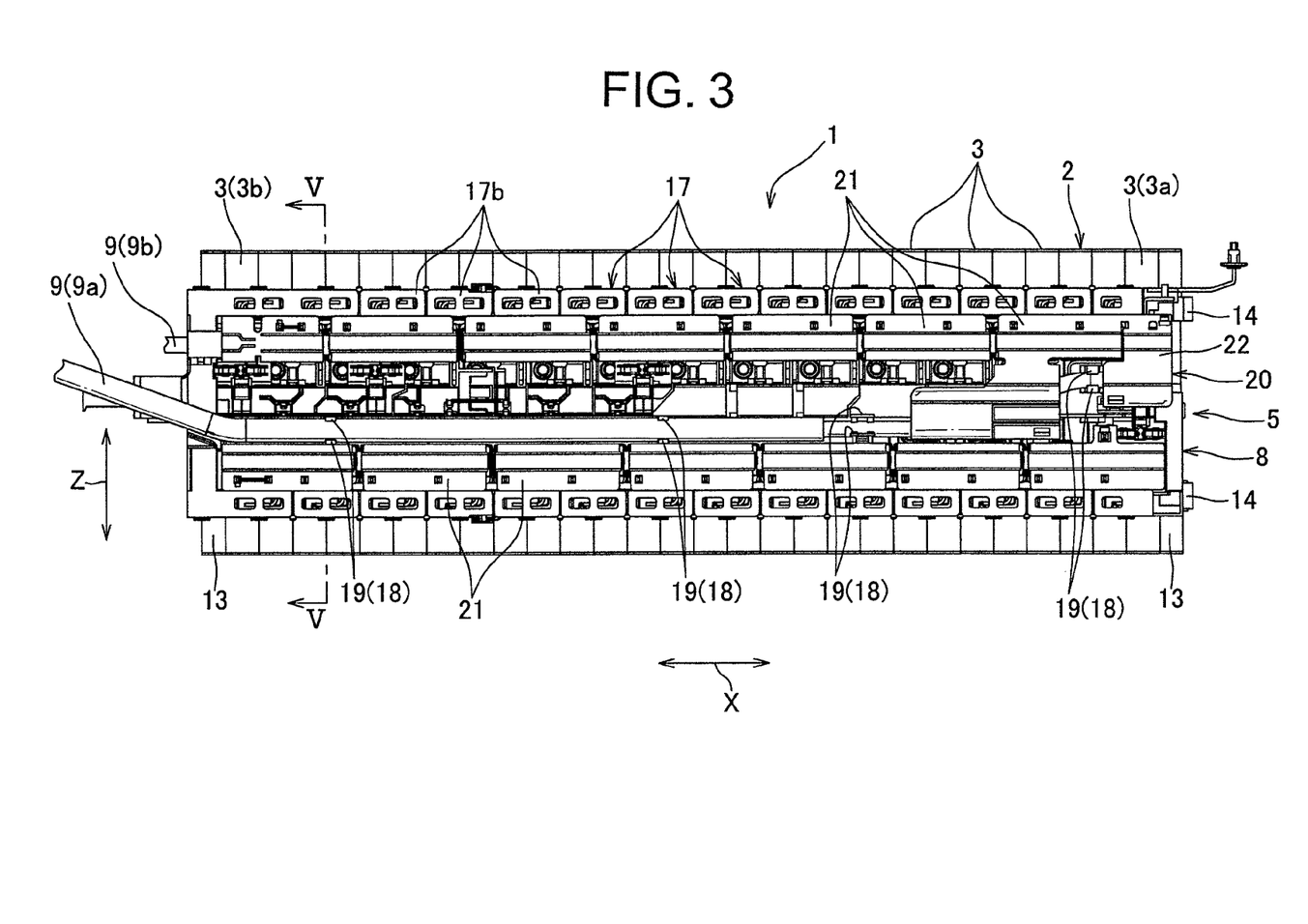
FIG. 3 is a plan view of the power supply apparatus of FIG. 1.
Figure 4:
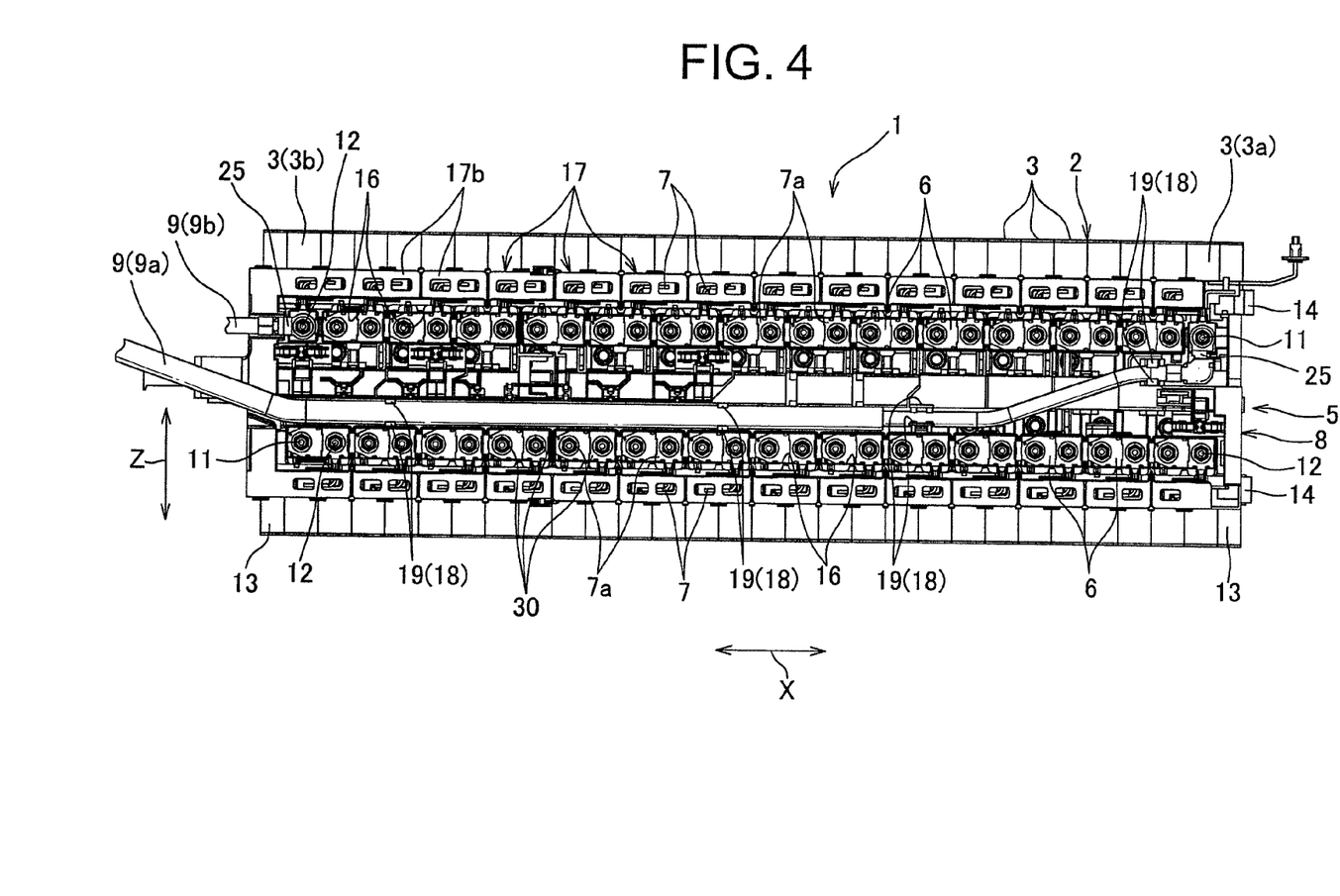
FIG. 4 is a plan view of the busbar module of the power supply apparatus of FIG. 3 with a cover detached from the busbar module.

Referring to FIGS. 2 and 4, the battery cells 3 each include a rectangular battery cell body 10, a positive electrode 11 (hereafter called a "positive terminal"), and a negative electrode 12 (hereafter called a "negative terminal").

The positive terminal 11 is provided at one end of the battery cell body 10. The negative terminal 12 is provided at the other end of the battery cell body 10. The positive terminal 11 and the negative terminal 12 are made of electrically conductive metal in a columnar shape. The positive terminal 11 and the negative terminal 12 project in the same direction from an end face 10a (hereafter called a "one end face") of the battery cell body 10 such that these terminals 11, 12 are parallel to each other.

As shown in FIGS. 2 and 4, the battery cells 3 with the aforementioned configuration are arranged in one direction (indicated by an arrow X in FIG. 1) with the one end faces 10a residing on the same plane, such that the positive terminal 11 of one of a mutually adjacent pair of the battery cells 3 and the negative terminal 12 of the other of the mutually adjacent pair of the battery cells 3 are positioned next to each other. In other words, the battery cells 3 are alternately inversely stacked such that the positive terminals 11 and the negative terminals 12 are alternately inversely arranged.

The fixing member 4 includes a pair of end plates 13 and a binding band 14. The pair of end plates 13 are made of an insulating material in a shape of a box. As shown in FIGS. 1 and 2, the pair of end plates 13 are each arranged at corresponding each of both ends of the battery cell assembly 2 in an arrangement direction X such that the aforementioned battery cells 3 are sandwiched therebetween. The arrangement direction X refers to a direction in which the battery cells 3 are arranged.

The binding band 14 is made of an insulating material in a shape of a strip. There is provided a plurality of the binding bands 14 (four in the illustrated example). As shown in FIGS. 1 and 2, the binding bands 14 are disposed on an upper surface 2a and a bottom surface 2b of the battery cell assembly 2, respectively.

The upper surface 2a is constituted by the one end faces 10a of the battery cells 3, and the bottom surface 2b is another surface of the battery cell assembly 2 opposite the upper surface 2a thereof. The binding bands 14 are arranged in parallel with the arrangement direction X in which the battery cells 3 are arranged, and spaced from each other in a direction orthogonal to the same arrangement direction X.

As shown in FIGS. 1 and 2, the fixing member 4 with the aforementioned construction is configured to sandwich the aforementioned battery cells 2 between the pair of end plates 13, with both ends of each of the binding bands 14 in its longitudinal direction are each secured to the corresponding each of the end plates 13 for example by means of bolts, so that the battery cells 3 are bound and retained in an integral manner.

In the illustration of FIG. 1, an arrow X indicates the arrangement direction in which the battery cells 3 are arranged and also indicates a longitudinal direction of the battery cell assembly 2. An arrow Z indicates a width direction of the battery cell assembly 2. An arrow Y indicates a height direction of the battery cell assembly 2.

A primary function of the busbar module 5 is to connect (series-connect) the aforementioned battery cells 3 in series with each other.

As shown in FIG. 1 and FIG. 2, the busbar module 5 includes: a plurality of bus bars 6 that connect the battery cells 3 in series with each other; a plurality of voltage-detecting electric wires 7 that are connected to each of the bus bars 6 (see FIGS. 3 and 4); and a plate 8 made of synthetic resin and adapted to accommodate the bus bars 6 and the electric wires 7.

The bus bar 6 may be made of a pressed electrically conductive metal plate having a pair of holes therein. The mutually adjacent positive and negative electrodes 11, 12 of the mutually adjacent pair of battery cells 3 are passed through the pair of holes, respectively. The bus bar 6 is secured to the battery cell 3 by means of a nut 30 (shown in FIG. 2) screwed onto the positive and negative electrodes 11, 12 each passed through corresponding each of the pair of holes.

The voltage-detecting electric wire 7 is a known sheathed electric wire including an electrically conductive core wire and an insulating sheath covering the core wire. A connecting terminal 7a connectable to the bus bar 6 is attached to one end of the voltage-detecting electric wire 7 while the other end thereof is connected to a not-shown voltage detection circuit.

The connecting terminal 7a, which may be made of a pressed metal plate, includes: a busbar-connect portion (not shown) disposed on the bus bar 6 to be electrically connected to the same bus bar 6; and an wire-connect portion (not shown) attached to one end of the voltage-detecting electric wire 7 for providing electrical connection to the same voltage-detecting electric wire 7. There is provided a hole in the busbar-connect portion.

The plate 8 is made of insulating synthetic resin. As shown in FIGS. 1 and 2, the overall planar shape of the plate 8 is rectangular, whose length in the longitudinal direction is substantially equal to the length of the upper surface 2a of the battery cell assembly 2.

The plate 8 includes a body 15 (also referred to as a "plate body") having a flat plate shape and disposed on the upper surface 2a of the battery cell assembly 2; a plurality of first accommodating portions 16 each accommodating the bus bars 6 and the connecting terminals 7a connected to corresponding each of the bus bars 6; a second accommodating portion 17 accommodating each of the voltage-detecting electric wires 7; an electric wire holding portion 18 holding one electric wire 9a of the aforementioned pair of electric wires 9; and a cover 20 attached to the plate body 15.

As shown in FIG. 1, the first accommodating portions 16 each continue to corresponding each of a plurality of wall portions 27 (illustrated in FIGS. 5 and 6) upstanding from the plate body 15 so as to take a box shape defined to be capable of accommodating the bus bar 6 and the connecting terminal 7a connected to the bus bar 6. The first accommodating portions 16 are arranged in the longitudinal direction of the plate 8 (i.e., in the arrangement direction X in which the battery cells 3 are arranged). The first accommodating portions 16 are arranged in two rows in the width direction of the plate 8 (i.e., in the width direction Z of the battery cell assembly 2) to be spaced from each other.

The first accommodating portions 16 each have a pair of throughholes (not shown) extending through the plate body 15 to be adapted to coincide with the pair of holes of the bus bar 6. The positive and negative electrodes 11, 12 of the battery cell 3 passed through each of the pair of throughholes are passed through each of the holes of the bus bar 6 and a hole of the connecting terminal 7a.

As shown in FIGS. 1 and 2, the second accommodating portions 17 are arranged in the longitudinal direction of the plate 8 (i.e., in the arrangement direction X in which the battery cells 3 are arranged). The second accommodating portions 17 are provided at both sides in the width direction of the plate 8 (indicated by the arrow Z) and arranged in two rows adjacent to the first accommodating portions 16 with the first accommodating portions 16 found inward thereof.

Also, the second accommodating portions 17 each includes: an electric wire accommodating portion 17a in a shape of a gutter that can accommodate the voltage-detecting electric wires 7, the electric wire accommodating portion 17a being upstandingly provided on an outer surface of the first accommodating portions 16; and a cover 17b operable to open and close an opening of the electric wire accommodating portion 17a, the cover 17b being connected to the electric wire accommodating portion 17a by means of a hinge 17c.

Figure 5:
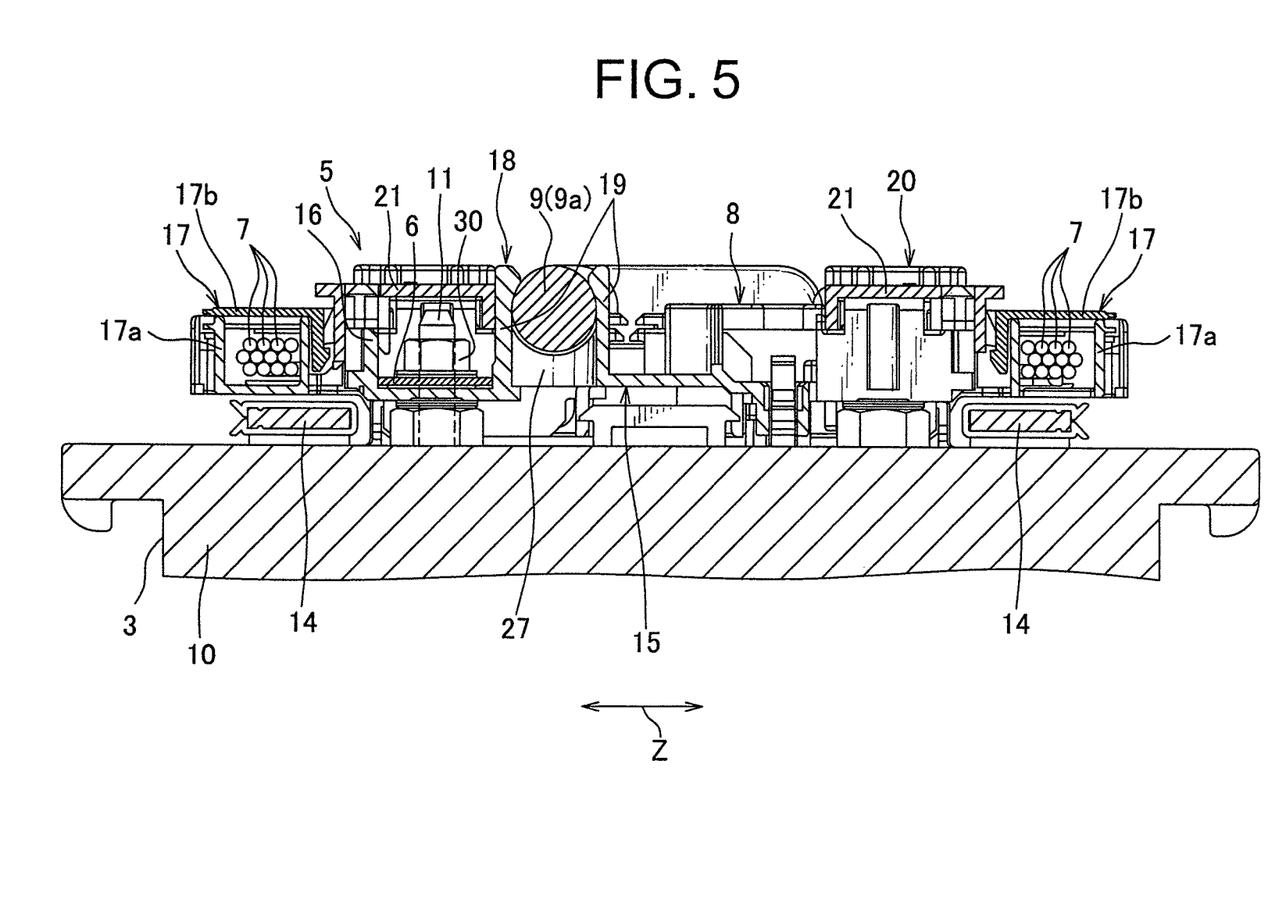
FIG. 5 is a cross-sectional view taken along the line V-V of FIG. 3.

As shown in FIG. 5, the cover 17b is constructed to prevent the voltage-detecting electric wires 7 accommodated in the electric wire accommodating portion 17a from getting out of the accommodation space. The second accommodating portions 17 are each configured to accommodate thereinside each of the voltage-detecting electric wires 7 and the wire-connect portion of the connecting terminal 7a connected thereto.

The electric wire holding portion 18, as shown in FIGS. 1 to 4, is disposed between the first accommodating portions 16 arranged in two rows spaced from each other in the width direction of the plate 8 (indicated by the arrow Z) and between the first accommodating portion 16 of one of the two rows and the plate body 15, i.e., at a central portion of the plate 8, the portion being central with reference to the width direction of the plate 8 (indicated by the arrow Z).

Figure 6:
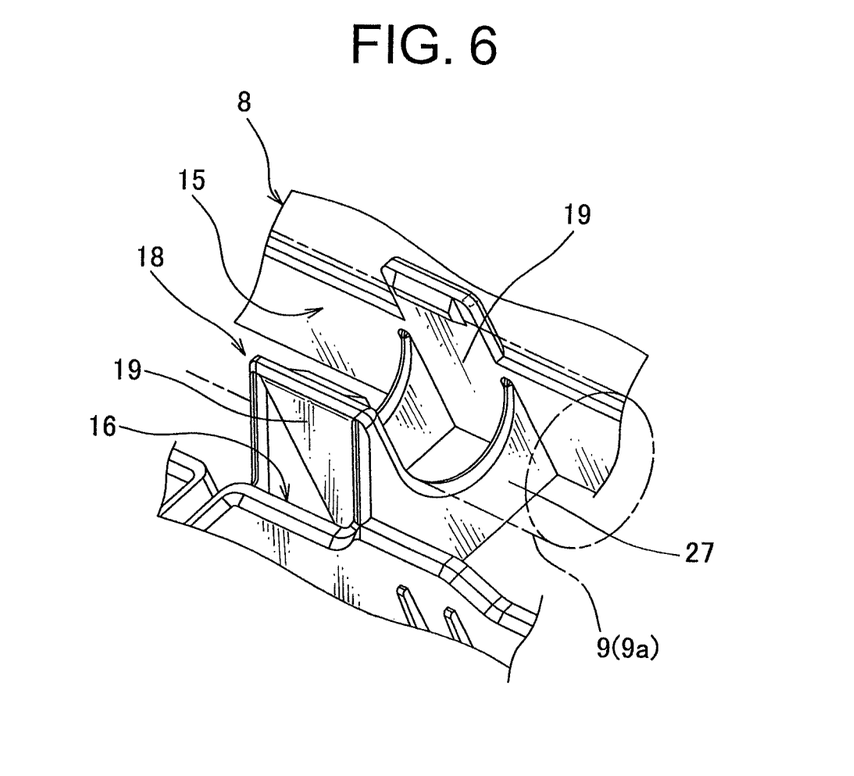
FIG. 6 is a perspective view of an electric wire holding portion of the busbar module of the power supply apparatus of FIG. 1.

There is provided a plurality of the electric wire holding portions 18 spaced from each other and arranged in the longitudinal direction of the plate 8 (i.e., in the arrangement direction X in which the battery cells 3 are arranged). There are provided four holding portions 18 in the illustrated example. As shown in FIG. 6, the electric wire holding portions 18 includes (i) a pair of securing pieces 19 adapted to position the one electric wire 9a of the pair of the electric wires 9 and adapted to clamp the one electric wire 9a therebetween; and (ii) the above-described wall portion 27.

One of the pair of securing pieces 19 takes a shape of a strip and protrudes from the plate body 15 in one piece therewith. The other of the pair of securing pieces 19 takes a shape of a strip and protrudes from the first accommodating portion 16 in one piece therewith. The pair of securing pieces 19 are spaced from each other and arranged in the width direction of the plate 8 (i.e., in the width direction Z of the battery cell assembly 2). As shown in FIG. 5, the pair of securing pieces 19 are configured to clamp therebetween the one electric wire 9a of the pair of electric wires 9 to hold the one electric wire 9a. As illustrated in FIG. 6, the one electric wire 9a is disposed in an overlapping manner upon the wall portion 27.

As shown in FIGS. 1 and 2, the cover 20 includes a plurality of first covers 21 each covering an opening of the first accommodating portions 16; and a second cover 22 covering a connection between (a) a later-described terminal 25 of the one electric wire 9a (of the pair of electric wires 9) and (b) the positive terminal 11 of the one battery cell 3a at one end of the battery cell assembly 2 constructed by the battery cells 3 arranged in the longitudinal direction (arrangement direction X).

Referring to FIG. 5, the first covers 21 each have a shape of a gutter defined by a strip-like ceiling wall and sidewalls upstanding from both ends of the ceiling wall in the direction indicated by the arrow Z. The first covers 21 are connected to each other and arranged in the longitudinal direction of the plate 8 (i.e., in the arrangement direction X in which the battery cells 3 are arranged).

As shown in FIGS. 1 and 2, the first covers 21 are spaced from each other and arranged in two rows in the width direction of the plate 8 (i.e., in the width direction Z of the battery cell assembly 2). The first covers 21 are connected to each other by means of a connecting portion 23.

As shown in FIGS. 1 and 2, the second cover 22 has a substantially rectangular flat plate shape with one end thereof in its longitudinal direction connected to one first cover 21a positioned at one end of the plurality of first covers 21a, the first covers 21a arranged in the longitudinal direction of the plate 8 (i.e., in the arrangement direction X in which the battery cells 3 are arranged).

In the cover 20 having the aforementioned configuration, each of the plurality of the first covers 21 is adapted to cover an opening of each of the first accommodating portions 16 and is attached to each of the first accommodating portion 16. Also, the second cover 22 is attached as opposed to the plate body 15 so as to cover the connection between the terminal 25 (later described) of the one electric wire 9a of the pair of the electric wires 9 and the positive terminal 11 of the battery cell 3a of the battery cell 3a at the one end of the battery cells 3 arranged in the longitudinal direction of the battery cell assembly 2.

The pair of electric wires 9 are a known sheathed electric wire including an electrically conductive core wire and an insulating sheath covering the core wire. As shown in FIG. 2, a terminal 25 is connected to each end of the pair of electric wires 9, the terminal 25 being connectable to the positive or negative electrode 11, 12 of the battery cell 3. The terminal 25 includes a hole 25a through which the positive or negative electrode 11, 12 is passed through.

The one electric wire 9a of the pair of the electric wires 9 is connected to the positive terminal 11 of the battery cells 3a. In this state, the positive terminal 11 of the one battery cell 3a, which is at the one end of the battery cells 3 arranged in the longitudinal arrangement direction X of the battery cell assembly 2, is passed through the hole 25a of the terminal 25 of the one electric wire 9a, with the nut 30 (shown in FIG. 2) screwed onto the positive terminal 11. The one electric wire 9a is arranged on the battery cell assembly 2 over a substantially entire length of the battery cell assembly 2.

Likewise, the other electric wire 9b of the pair of the electric wires 9 is connected to the negative terminal 12 of the other battery cell 3b. In this state, the negative terminal 12 of the other battery cell 3b, which is at the other end of the battery cells 3 arranged in the longitudinal direction (arrangement direction X) of the battery cell assembly 2, is passed through the hole 25a of the terminal 25 of the other electric wire 9b, with the nut 30 (shown in FIG. 2) screwed onto the negative terminal 12. It should be noted that the other electric wire 9b is not arranged on the battery cell assembly 2 over the substantially entire length thereof.

The following several paragraphs are dedicated to the description of the manner in which the power supply apparatus 1 having the aforementioned configuration is assembled.

First, as a preliminary phase, the components belonging to the busbar module 5, i.e., the bus bars 6, the connecting terminals 7a of the voltage-detecting electric wires 7, and the plate 8, are separately manufactured, and, as shown in FIGS. 2 and 4, each of the bus bars 6 is fitted in corresponding each of the first accommodating portions 16 of the plate 8. The bus bars 6 may be inset-molded on the plate 8 to be disposed inside of each of the first accommodating portions 16.

The voltage-detecting electric wires 7 are each accommodated in corresponding each of the electric wire accommodating portions 17a of the second accommodating portions 17. As shown in FIG. 4, each of the connecting terminals 7a connected to corresponding each of the voltage-detecting electric wire 7 are fitted into corresponding each of the first accommodating portions 16 in a manner that they are disposed on the bus bar 6. In this way, the bus bars 6 and the voltage-detecting electric wires 7 are attached to the plate 8 of the busbar module 5.

Next, the plate 8 of the busbar module 5, with the bus bars 6 and the voltage-detecting electric wires 7 attached to the plate 8 in the aforementioned manner is placed face to face with the upper surface 2a of the battery cell assembly 2. The plate 8 is then gradually moved close to the battery cell assembly 2 until the plate body 15 of the plate 8 is overlapped with the upper surface 2a of the battery cell assembly 2, and the positive and negative electrodes 11, 12 of each of the battery cells 3 of the battery cell assembly 2 are passed through the hole of each of the bus bars 6 and the hole of the connecting terminal 7a.

Subsequently, the positive terminal 11 of the one battery cell 3a at the one end of the battery cells 3, which are arranged in the longitudinal direction (arrangement direction X) of the battery cell assembly 2 is passed through a hole 25a of the terminal 25 of the one electric wire 9a of the pair of the electric wires 9. Also, the negative terminal 12 of the other battery cell 3b at the other end of the battery cells 3, which are arranged in the longitudinal direction (arrangement direction X) of the battery cell assembly 2 is passed through the hole 25a of the terminal 25 of the other electric wire 9b. Also, the pair of securing pieces 19 of each of the electric wire holding portions 18 provided at the plate 8 of the busbar module 5 sandwiches the one electric wire 9a so as to hold the one electric wire 9a. In this manner, the one electric wire 9a is secured to the plate 8.

After that, the nuts 30 (shown in FIG. 2) are screwed onto the positive and negative electrodes 11, 12 of each of the battery cell 3 of the battery cell assembly 2, the electrodes being passed through the holes of the connecting terminals 7 and the bus bars 6. Thus, as shown in FIG. 4, the positive and negative electrodes 11, 12 of each of the battery cells 3, each of the bus bars 6, each of the connecting terminals 7a, each of the voltage-detecting electric wires 7, each of the terminals 25, and each of the electric wires 9, are together brought into a fixed state.

Finally, each of the first covers 21 of the cover 20 each cover the openings of the first accommodating portions 16 and are connected to each of the first accommodating portion 16, and the second cover 22 covers a connection between the terminal 25 of the aforementioned one electric wire 9a and the positive terminal 11 of the one battery cell 3a, so that the cover 20 is attached as opposed to the plate body 15.

As has been explained in the foregoing, the entire busbar module 5 is disposed on the battery cell assembly 2 to be attached to the battery cell assembly 2. In this manner, the power supply apparatus 1 is assembled.

According to the above-described embodiment, the electric wire holding portion 18 extends in the arrangement direction X (in which the battery cells 3 are arranged) and is arranged at the central portion of the plate 8 in the width direction Z orthogonal to the arrangement direction X (in which the battery cells 3 are arranged).

Accordingly, it is possible to reduce the possibility of external components coming into contact with the electric wire 9a connected to the electrode 11, 12 used to take out a voltage of the series-connected battery cells 3 due to vibrations during driving and large impacts in the event of vehicle's collision. Also, the external components is prevented from coming into contact with the connection between the one electric wire 9a and the electrode 11 connected thereto. Thus, it is made possible to reduce the possibility of damage to the one electric wire 9a.

Also, the plate 8 includes the cover 20 configured to cover the connection between the one electric wire 9a and the electrode 11 to which the one electric wire 9a is connected. Accordingly, it is possible to prevent the external components from coming into contact with the connection between the one electric wire 9a and the electrode 11 due to the vibrations during driving and the large impacts in the event of collision of the vehicle. Thus, the connection between the one electric wire 9a and the electrode 11 is protected against damage and disconnection.

Further, the electric wire holding portion 18 makes the one electrical wire 9b rest upon and overlap with the wall portion 27 continuing to the plate body 15 and the first accommodating portion 16. The one of the securing pieces 19 is provided on the plate body 15 in one piece therewith, and the other of the securing pieces 19 is provided on the first accommodating portion 16 in one piece therewith. Accordingly, there is no need for the plate 8 to have a portion dedicated to making the one electrical wire 9a overlap therewith or portions dedicated to clamping the one electrical wire 9a therebetween, which makes it possible to prevent the plate 8 from becoming larger.

Also, the power supply apparatus of this embodiment includes the aforementioned busbar module 5. Accordingly, it is possible to reduce the possibility of the external component coming into contact with the electric wire 9a connected to the electrode 11, 12 to take out the voltage of the series-connected battery cells 3 due to the vibrations during driving and the larger impacts in the event of vehicle's collision. Also, the external components is prevented from coming into contact with the connection between the electrode 11 and the electric wire 9a.

Thus, it is possible to reduce the possibility of damage to the one electric wire 9a, and prevent the damage to and the disconnection of the connection connecting the one electric wire 9a to the electrode 11.

It should be appreciated that the aforementioned embodiment is an exemplary one of the present invention, and that the present invention is in no way limited to the illustrated embodiment. The present invention can be effectuated insofar as the scope and spirit of the present invention are not deviated from.

REFERENCE NUMERALS

1 Power supply apparatus
2 Battery cell assembly

3 Battery cell
5 Busbar module
6 Bus bar
8 Plate
9 Electric wire
9a One electric wire
11 Positive terminal (positive electrode)
12 Negative terminal (negative electrode)
15 Plate Body
16 First accommodating portion
18 Electric wire holding portion
19 Securing piece
20 Cover
27 Wall portion

The invention claimed is:

1. A busbar module comprising:
a plurality of bus bars configured to connect a plurality of battery cells in series with each other, the battery cells each having a positive electrode and a negative electrode, the positive electrode of one of a mutually adjacent pair of the battery cells being connected to the negative electrode of an other of the mutually adjacent pair of the battery cells, and thereby the battery cells constructing a battery cell assembly;
a plate disposed upon the battery cell assembly, with the bus bars attached to the plate; and
an electric wire holding portion provided on the plate and configured to hold one electric wire of a pair of electric wires, the pair of electric wires each being connected to one electrode of the battery cells connected in series with each other so as to take out a voltage of the battery cells, the electric wire holding portion extending in an arrangement direction in which the battery cells are arranged, and the electric wire holding portion being provided at a central portion of the plate, the central portion being central with reference to a width direction orthogonal to the arrangement direction, wherein the electric wire holding portion includes: a wall portion continuing to a plate body of the plate and to a first accommodating portion accommodating the bus bar, wherein the one electrical wire is disposed in an overlapping manner upon the wall portion; and a pair of securing pieces adapted to clamp the one electric wire therebetween,
wherein one of the pair of securing pieces takes a shape of a strip and protrudes from the plate body in one piece therewith, and the other of the pair of securing pieces takes a shape of a strip and protrudes from the first accommodating portion in one piece therewith.

2. The busbar module according to claim 1, wherein the plate includes a cover configured to cover a connection between the one electric wire and the one electrode to which the one electric wire is connected.

3. The busbar module according to claim 1, wherein both the one electric wire and the other electric wire of the pair of electric wires are guided outwardly from one end portion of the central portion of the plate.

4. The busbar according to claim 1, wherein a voltage-detecting electrical wire is received in an edge portion of the width direction of the plate holding the first accommodating portion.

5. A power supply apparatus comprising:
a battery cell assembly constructed by battery cells each having a positive electrode at one end thereof and a negative electrode at an other end thereof;
the busbar module of claim 1, the busbar module being attached to the battery cell assembly and configured to connect the battery cells of the battery cell assembly in series with each other; and
a pair of electric wires each connected to the electrode that takes out a voltage of the battery cells connected in series with each other.

* * * * *